United States Patent [19]

Kawaguchi et al.

[11] Patent Number: 4,939,585
[45] Date of Patent: Jul. 3, 1990

[54] METHOD AND APPARATUS FOR RECORDING A VIDEO FORMAT SIGNAL HAVING A TIME CODE

[75] Inventors: Tomoyuki Kawaguchi; Kaoru Kobayashi, both of Yamanashi, Japan

[73] Assignees: Pioneer Electronic Corporation, Tokyo; Pioneer Video Corporation, Yamanashi, both of Japan

[21] Appl. No.: 183,963

[22] Filed: Apr. 20, 1988

[30] Foreign Application Priority Data

Apr. 24, 1987 [JP] Japan .................................. 62-102394

[51] Int. Cl.⁵ .......................... H04N 5/76; G11B 27/10
[52] U.S. Cl. .................................... 358/335; 360/14.1; 360/72.1
[58] Field of Search ...................... 360/13, 14.1, 72.2, 360/72.1, 36.1, 36.2, 37.1; 358/311, 320, 337, 339, 335; 369/47, 48, 49

[56] References Cited

U.S. PATENT DOCUMENTS

| | | |
|---|---|---|
| 4,134,130 | 1/1979 | Tachi . |
| 4,167,028 | 9/1979 | Tobey .................... 360/72.2 |
| 4,175,267 | 11/1987 | Tachi . |
| 4,189,756 | 2/1980 | Ninomiya . |
| 4,300,171 | 11/1981 | Tachi . |
| 4,503,470 | 3/1985 | Mita et al. . |
| 4,532,560 | 7/1985 | Williams .................... 360/13 |
| 4,567,531 | 1/1986 | Tabata .................... 358/335 |
| 4,802,023 | 1/1989 | Williams .................... 360/13 |

OTHER PUBLICATIONS

West German Search Report, #P38 13 682.1.

Primary Examiner—Robert L. Richardson
Attorney, Agent, or Firm—Sughrue, Mion, Zinn, Macpeak & Seas

[57] ABSTRACT

An apparatus and method of recording a video format signal having a vertical blanking interval on a recording medium. The number of frames of the video format signal to be recorded on the recording medium is counted, and a first time code is generated such that one second corresponds to L-frames of the video format signal. The first time code is then incremented N-times within a predetermined period of the video formal signal, thereby obtaining a second time code representing the incremented first time code. The second time code is then inserted into the video blanking interval of the format signal, thereby producing a video format signal having a time code which is relatively close to the actual elapsed time of the signal.

10 Claims, 3 Drawing Sheets

FIG. 1(A)
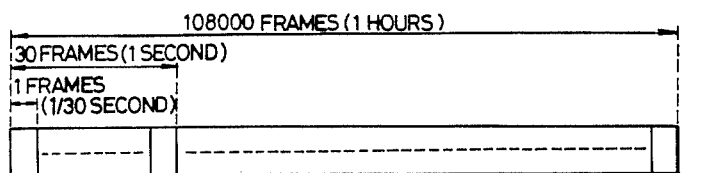
FIG. 1(B)
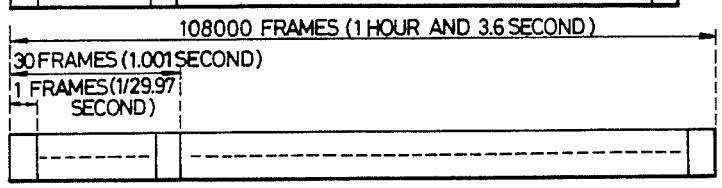
FIG. 3
| H | M | S | FRAME |
|---|---|---|---|
| 0 | 0 | 0 | 0 |
| ⋮ | | | |
| 0 | 0 | 29 | 27 |
| 0 | 0 | 29 | 28 |
| 0 | 0 | 30 | 0 |
| ⋮ | | | |
| 0 | 0 | 59 | 27 |
| 0 | 0 | 59 | 28 |
| 0 | 1 | 0 | 0 |
| ⋮ | | | |
| 0 | 4 | 29 | 27 |
| 0 | 4 | 29 | 28 |
| 0 | 4 | 30 | 0 |
| ⋮ | | | |
| 0 | 4 | 59 | 27 |
| 0 | 4 | 59 | 28 |
| 0 | 4 | 59 | 29 |
| 0 | 5 | 0 | 0 |
| ⋮ | | | |

METHOD AND APPARATUS FOR RECORDING A VIDEO FORMAT SIGNAL HAVING A TIME CODE

FIELD OF THE INVENTION

The present invention relates to a method and apparatus for recording a so-called video format signal on a recording medium such as a video disk or the like.

BACKGROUND OF THE INVENTION

A so-called video format signal is similar to that of a composite video signal. More particularly, a video format signal includes successive field signals each of which has an information signal portion for carrying video information, and a synchronizing signal portion which includes horizontal and vertical blanking intervals. In general, each frame of the video format signal includes a pair of field signals.

In prior art methods of recording a video format signal on a recording medium (e.g. a disk), a time code is generated which represents an elapsed time of the video format signal. The time code is inserted in the vertical blanking interval of the format signal, thereby facilitating the location of a specified portion (e.g. frame) of the signal. In recording a video format signal, for example, a composite video signal of an NTSC system having a frequency of 59.94 Hz. a problem occurs in that the period of thirty (30) frames does not exactly correspond to one (1) second. As a result, there has been employed a recording method in which a time code is generated such that the period of thirty (30) frames of the video format signal will correspond to one (1) second, and the generated time code is inserted in the vertical blanking interval of the video format signal.

Such a time code has the advantage of not requiring arithmetic operations, thereby allowing the time code to be generated by a simple circuit arrangement. However, a problem still occurs in such methods since the time difference between the real elapsed time and the time represented by the generated time code is about 60 ms/min, which corresponds to about 3.6 secs/hr. Accordingly, in the operation of such a method, the specified location of the video format signal cannot be accurately found due to this time difference. Referring to FIGS. 1(A) and 1(B), wherein FIG. 1(A) shows frames of the video format signal according to the prior art method in which the period of thirty (30) frames is regarded as one second, and FIG. 1(B) shows frames of a video format signal of the NTSC system. As shown in FIG. (1B), thirty (30) frames of the video format signal correspond to about 1.001 seconds which converts into a time difference between the periods indicated in FIGS. 1(A) and 1(B) of about 3.6 secs/hr.

Thus, there is a continuing need in the art for recording a video format signal in which the time difference or error between a generated time code and the real elapsed time of the video format signal is relatively small.

SUMMARY OF THE INVENTION

It is therefore an object of the present invention to provide a video format signal recording method and apparatus in which the time difference between the generated time code and the real elapsed time is relatively small.

The present invention accomplishes this and other objects by providing a method and apparatus in which a number of frames of the video format signal to be recorded on the recording medium is counted, a program time code of the video format signal is generated such that one second corresponds to L-frames of the video format signal, the program time code is incremented N-times within a predetermined period of the video format signal, and the incremented time code is inserted into the vertical blanking interval of the video format signal, thereby providing a video format signal having a time code which is relatively close to the actual elapsed time of the signal.

BRIEF DESCRIPTION OF THE DRAWINGS

FIG. 1(A) shows a video format signal according to a prior art method of recording in which thirty frames is regarded as one second; and FIG. 1(B) shows a video format signal in accordance with the NTSC system.

FIG. 3 shows, in table form, the sequence of the program time code of the present invention.

PREFERRED EMBODIMENT OF THE INVENTION

Figure 2:
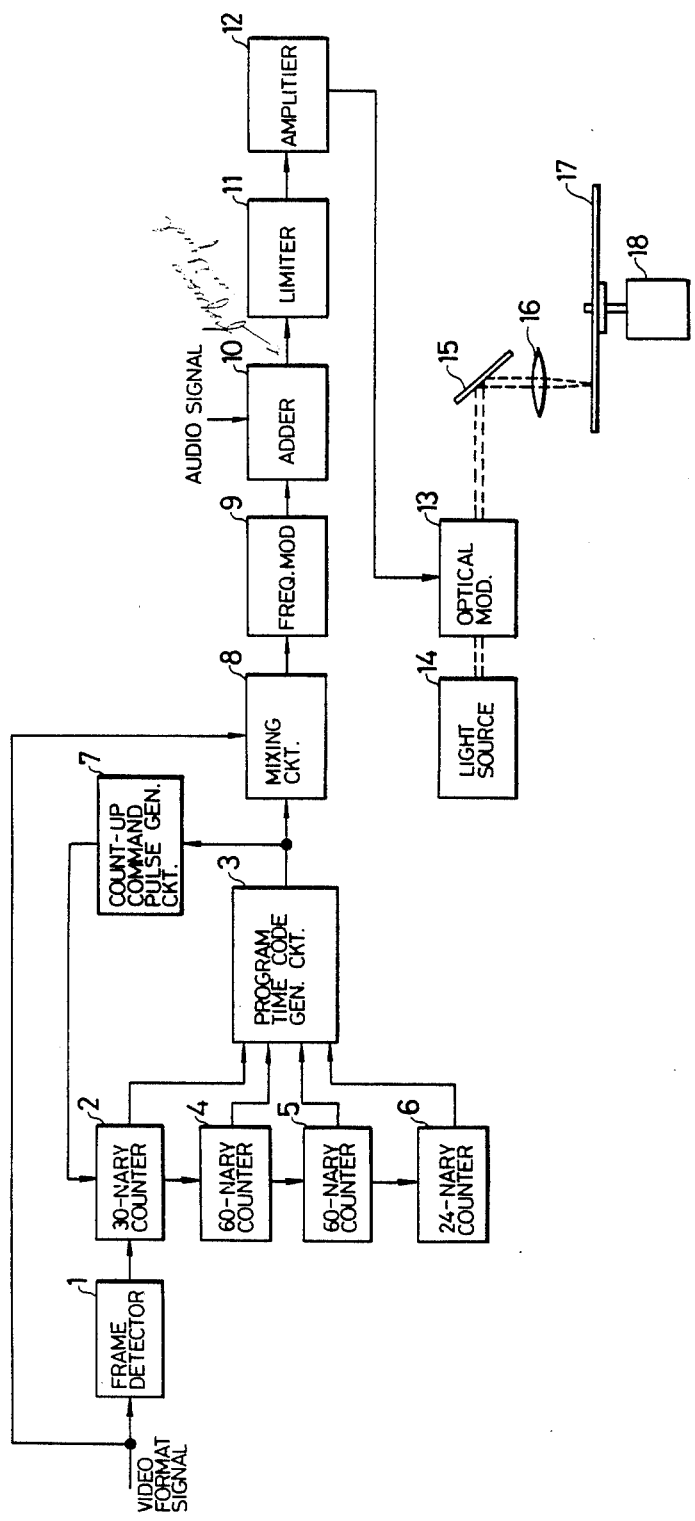
FIG. 2 is a block diagram showing a recording apparatus in accordance with the present invention.

FIG. 2 shows the recording apparatus in accordance with the present invention. In FIG. 2, a video format signal is applied to a frame detector 1 and to a mixing circuit 8. The frame detector 1 is designed such that it detects a starting point of each frame of the video format signal. For example, the frame detector circuit 1 serves to detect the vertical synchronizing signal of the video format signal, and in response thereto, outputs a frame detection pulse. The frame detection pulse is then applied to a clock input terminal of a 30-nary counter 2. An output from the 30-nary counter 2 is applied to a program time code generation circuit 3. A carry output of the 30-nary counter 2 (i.e. an output which occurs after 30 frames have been detected from circuit 1) is applied to a clock input terminal of a 60-nary counter 4. An output from the 60-nary counter is applied to the program time code generation circuit 3, and a carry output from the 60-nary counter 4 is applied to a clock input terminal of a second 60-nary counter 5 after 60 carry outputs from 30-nary counter 2 has occurred. An output from the 60-nary counter 5 is applied to the program time code generation circuit 3, and a carry output from the 60-nary counter 5 is applied to a clock input terminal of a 24-nary counter 6 after 60 carry outputs from counter 4 has occurred. The output from the 24-nary counter 6 is applied to the program time code generation circuit 3.

Thus, the program time code generation circuit 3 outputs a program time code representing hours, minutes, seconds, and a frame number in accordance with the outputs of the 30-nary counter 2, the 60-nary counters 4 and 5, and the 24-nary counter 6. The program time code generated from the program time code generation circuit 3 is then applied to a count-up command pulse generation circuit 7 and to the mixing circuit 8. The count-up command pulse generation circuit 7 is designed such that it supplies count-up command pulse to 30-nary counter 2, for example, whenever the program time code is increased by a value corresponding to 899 frames. However, circuit 7 is designed such that it will generate count-up pulses for only nine consecutive values of the program time code (i.e. each value corresponding to 899 frames). More particularly, circuit 7 will not generate a count-up command pulse when the program time code is further increased (i.e. after the ninth time it receives a program time code corresponding to 899 frames) to a tenth time it receives a program time code corresponding to 899 frames. After skipping a count-up pulse upon the tenth time it receives a program time code representing 899 frames, the count-up command pulses will begin again according to the sequence indicated above. The count-up command pulses generated from the count-up pulse generation circuit 7 is applied to a count-up pulse input terminal of the 30-nary counter 2, thereby increasing the count value of the 30-nary counter by one.

On the other hand, the video format signal is also applied to the mixing circuit 8 which serves to insert the program time code from circuit 3 at a predetermined position in the vertical blanking interval of the video format signal. A video format signal having the inserted program time code then is applied to a frequency modulator 9 from the mixer circuit 8. In the frequency modulator 9, a carrier of a predetermined frequency is frequency-modulated in accordance with the video format signal from mixer circuit 8. The frequency-modulated 9 signal is then applied to an adder circuit 10 which adds the frequency-modulated signal to a pulse-code-modulating audio signal or a frequency modulated analog audio signal, thereby performing frequency multiplication. The signal from adder 10 is applied to an optical modulator 13 through a limiter circuit 11 and an amplifier circuit 12. Furthermore, the apparatus of FIG. 2 includes a light source 14 (e.g. a semiconductor laser or the like) which emits a light beam. The light beam passes through the optical modulator 13 such that the laser beam is intensity-modulated according to the output of amplifier 12. The intensity-modulated laser beam is then reflected by a mirror 15 to a surface of a recording disk 17 through a condenser lens 16 which serves to focus the laser beam onto disk 17. The recording disk 17 is radially moved at a constant speed by a motor 18 which is driven by a spindle servo loop (not shown) at a speed corresponding to a radial position of the focal point of the laser beam. As a result, the video format signal is recorded on a spiral shaft of the recording disk 17.

Referring now to FIG. 3, assuming that the program time code which is inserted into the vertical blanking interval of the video format signal of FIG. 2 is successively changed from 0-hours, 0-minutes, 0-seconds and 0-frames, the program time code of the video format signal will be 0-hours, 0-minutes 30-seconds, and 0-frames by advancing the numerical value representing the frame (i.e. with a count-up pulse) when the program time code has changed by a value corresponding to 899 frames, that is, when the program time code has become 0-hours, 0-minutes, 29-seconds, and 29-frames. Similarly, the numerical value representing the frame is advanced when the program time code has become 0-hours, 0-minutes, 59-seconds, and 29-frames; 0-hours, 1-minute, 29-seconds, and 29-frames; 0-hours, 1 minute, 59-seconds, and 29-frames; 0-hours, 2-minutes, 29-seconds, and 29-frames; 0-hours, 2-minutes, 59-seconds, and 29-frames; 0-hours, 3-minutes, 29-seconds and 29-frames; 0-hours, 3-minutes, 59-seconds, and 29-frames; 0-hours, 4-minutes, 29-seconds, and 29-frames. However, as indicated above, the numerical value representing the frame is not advanced when the program time code is further changed by a value corresponding to 899 frames to 0-hours, 4-minutes, 59-seconds and 29-frames.

Figure 4:
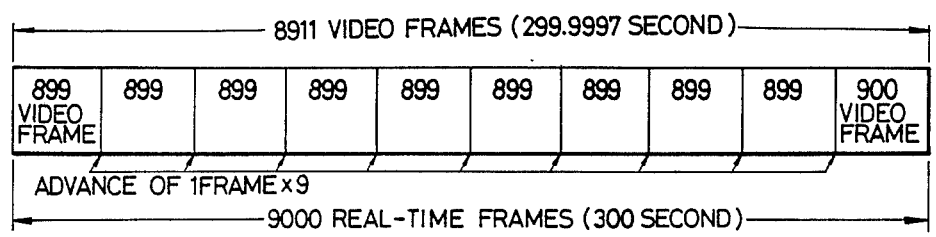
FIG. 4 shows a comparison between real-time frames and frames which have been time-coded in accordance with the present invention.
Figure 5:
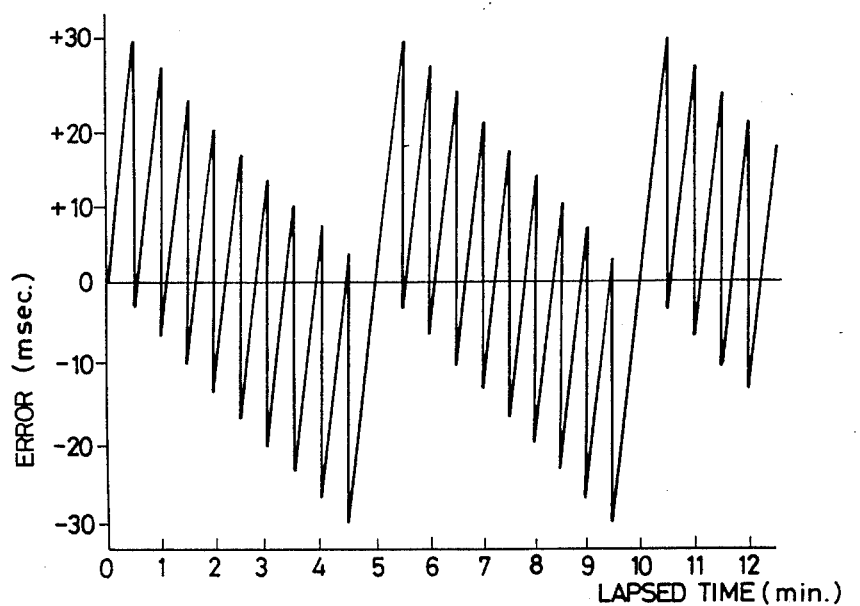
FIG. 5 is a graph showing the time difference between a real elapsed time and a program code time in accordance with the present invention.

Thus, as shown in FIG. 4, 8991 video frames (299.9997 seconds) corresponds to 9,000 real-time frames (300 seconds) on the assumption that 30 frames correspond to 1-second. As a result, as shown in FIG. 5, the maximum error between the real time frame and the video frame is only 31.5 ms, and the cumulative error or time difference between the real-time and the program time is only 3.1 ms/hr. Thus, the time difference or error between the real time and the program time is extremely small in comparison to the prior art methods of recording video format signals.

Although one frame is advanced whenever 899 video frames are detected from a starting time of recording the video format signal in the above embodiment, a similar real-time correction effect can be obtained when advancement is made by 2-frames for every 1798 video frames (which is twice as much as 899 frames). Similarly to the embodiment above, two count-up pulses would occur for nine consecutive time code values representing 7298 frames, and then no frame advancement (i.e. no count-up pulse) would occur when the next time code representing 7298 frames was received.

In conclusion, there has been described a recording method and apparatus which generates a time code representing an elapsed time which is extremely close to the real elapsed time of a video format signal. More particularly, the invention can accomplish this result even when the video format signal has a field frequency which cannot be represented by an integer.

While there has been described and illustrated a specific embodiment of the invention it will be clear that variations and modifications may be made without departing from the true spirit and scope of the invention which is defined in the appended claims.

What is claimed is:

1. A method of recording a video format signal having a vertical blanking interval on a recording medium, the method of comprising the steps of:
    counting a number of frames of the video format signal to be recorded on the recording medium;
    generating, with a plurality of counters, a first time code such that one second corresponds to L-frames of the video format signal;
    incrementing the first time code N-times within a predetermined period of the video format signal, thereby obtaining a second time code representing the incremented first time code; and
    inserting, with a mixing circuit, said second time code in the vertical blanking interval of the video format signal.

2. The method according to claim 1, wherein N and L are each a natural number.

3. The method according to claim 1, wherein said predetermined period corresponds to 8991 frames of the video format signal, N is equal to 9, and L is equal to 30.

4. The method according to claim 1, wherein the video format signal is in accordance with the NTSC system.

5. An apparatus for recording a video format signal having a vertical blanking interval on a recording medium, comprising:

means for counting a number of frames of the video format signal to be recorded on the recording medium;

means for generating a first time code such that one second corresponds to L-frames of the video format signal;

means for incrementing the first time code N-times within a predetermined period of the video format signal, thereby obtaining a second time code representing the incremented first time code; and means for inserting said second time code in the vertical blanking interval of the video format signal;

wherein said means for generating the first time code comprises a plurality of counters; and wherein said means for inserting a time code comprises a mixing circuit.

6. The apparatus according to claim 5, wherein said counting means comprises a frame detecting circuit for receiving the video format signal.

7. The apparatus according to claim 5, wherein L is equal to 30, N is equal to 9, and wherein said predetermined period corresponds to 8991 frames of the video format signal.

8. The apparatus according to claim 5, wherein L is equal to 30, N is equal to 9, and wherein said predetermined period corresponds to 1798 frames of the video format signal.

9. The apparatus according to claim 5, wherein said generating means comprises:

a divide by 30 counter having an input, an output, and a carry output, said input of said divide by 30 counter being connected to said frame-detecting circuit;

a first divide by 60 counter having an input, an output, and a carry output, said input of said carry output of said first divide by 60 counter being connected to the carry output of said divide by 30 counter:

a second divide by 60 counter having an input, an output, and a carry output, said input of said second divide by 60 counter being connected to said carry output of said first divide by 60 counter;

a divide by 24 counter having an input, and an output, the input of said divide by 24 counter being connected to the carry output of said second divide by 60 counter; and a program time code generating circuit having inputs for receiving the outputs of said divide by 30, said first and second divide by 60 , and said counters.

10. The apparatus according to claim 9, wherein said incrementing means comprises a count-up command pulse generating circuit connected to said divide by 30 counter and to said program time code generating circuit for supplying a pulse to said divide by 30 counter N-times within a predetermined period of an output of said program time code generating circuit.

* * * * *